No. 733,717. PATENTED JULY 14, 1903.
J. H. HASKINS.
METALLIC WHEEL.
APPLICATION FILED NOV. 30, 1900.
NO MODEL.
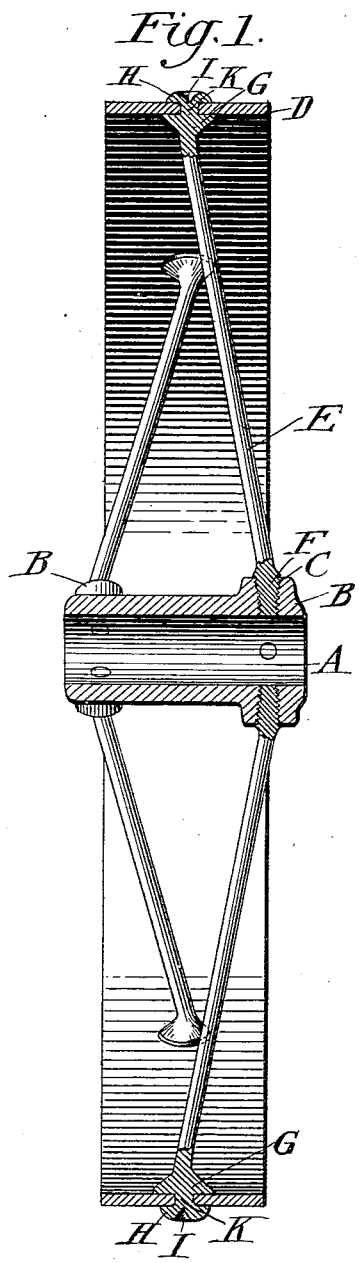
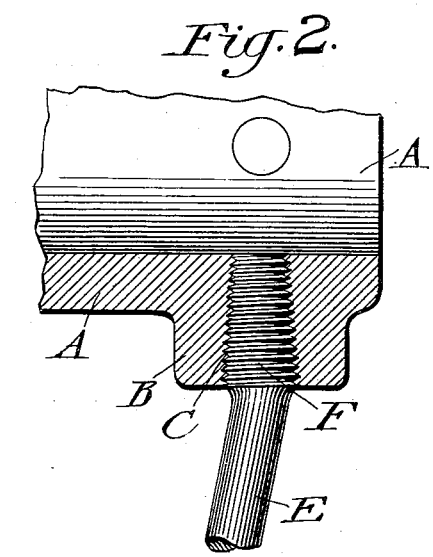
Witnesses:
Inventor:
J. H. Haskins,
By his attys.

No. 733,717.

Patented July 14, 1903.

UNITED STATES PATENT OFFICE.

JAMES H. HASKINS, OF CHICAGO, ILLINOIS, ASSIGNOR TO McCORMICK HARVESTING MACHINE COMPANY, OF CHICAGO, ILLINOIS.

METALLIC WHEEL.

SPECIFICATION forming part of Letters Patent No. 733,717, dated July 14, 1903.

Application filed November 30, 1900. Serial No. 38,181. (No model.)

*To all whom it may concern:*

Be it known that I, JAMES H. HASKINS, a citizen of the United States, and a resident of Chicago, county of Cook, and State of Illinois, have invented certain new and useful Improvements in Metallic Wheels; and I do hereby declare the following to be a full, clear, and exact description of the invention, such as will enable others skilled in the art to which it appertains to make and use the same.

The invention relates to the construction of metallic wheels and particularly to that class of broad-tread wheels that are employed on agricultural machines—such as mowers, reapers, and the like.

The object of the invention is to secure the inner ends of the spokes to the hubs without the use of jam-nuts, collars, or other projections bearing against the outer ends of the sockets.

To this end the invention consists in providing the hubs of the wheels with radial bosses projecting beyond the circumference and in forming tapering sockets in these bosses to receive the inner ends of the spokes. The sockets are threaded interiorly, and the spoke ends are made conical and threaded exteriorly to fit the sockets. The sockets form seats for the spokes and the threaded ends of the latter are screwed therein until they are jammed so tightly that the interior of the sockets, including the threads, are completely filled. No exterior projections are employed to limit the extent to which the threaded ends of the spokes are thus screwed in, but the jamming of the threads only determines the distance which they enter the sockets, and the spokes find their seats by being jammed against the walls of the sockets instead of being screwed up against limiting projections on the outside of the spokes or the inside of the sockets.

The improvements will be more clearly understood from the following description, taken in connection with the accompanying drawings, in which—

Figure 1 is a sectional elevation, and Fig. 2 is an enlarged detail, of the spoke-fastening.

Although the wheel herein illustrated has two sets of staggered spokes that are inclined and separated from each other, it is to be understood that it may be made with straight spokes, if desired, and that only one set of spokes may be employed if the character of the work for which the wheel is intended permits or makes such arrangement desirable.

Referring to Fig. 1, A denotes the hub of the wheel. It may be cast or forged and may be of any convenient size, shape, and length. It is shown herein as a plain straight cylinder and is provided near its opposite ends with radial bosses B, projecting beyond the circumference. In these bosses are formed tapered or outwardly-flaring sockets C, and the inner ends of the spokes are enlarged, as shown at F, and made tapered or conical to fit in the sockets. The sockets extend preferably clear through the hub, as best indicated in Fig. 3, and have screw-threads cut in their interior with a tapered die throughout their length. The enlarged conical ends of the spokes have corresponding threads cut on their peripheries, and by forming these parts in this way I am enabled to turn the spokes into the hubs until the threads fit so closely that the usual jam or stay nuts are unnecessary to keep them tight. The conical shape of the sockets and the spoke ends contributes largely to this result, as experience has demonstrated that, owing, among other things, to the wear of the dies, it is practically impossible to secure a good fit with straight-sided sockets, whereas with the conical sockets it is possible to turn the spokes into them until the threads fit perfectly, thus forming a solid jammed joint by screwing alone.

In assembling and setting up my improved wheel the spokes are set in the hub-sockets and screwed up to a perfectly tight fit, as already explained. The outer ends are then passed through the holes in the rim, so that the rim rests against the shoulders G, near the outer ends of the spokes. The projecting ends are then upset and driven down firmly against the outer face of the rim. In this process as usually performed the spokes are generally worked cold, and if the ends be upset with a simple concave die, so as to make the ordinary mushroom-heads, the metal of the projecting ends of the spokes will crystallize, with the result that it is weakened structurally, and a sharp blow delivered on the rim of the wheel, as when it strikes a stone, will fracture the spoke at the junction of the head and cause the head to fly off, thereby completely detaching the spoke from the rim. I therefore prefer to have the end of the spoke expanded at the time it is upset, and it is found that the structure of the metal is not altered or impaired, but the head is spread outwardly from the punch as a center, bending or deflecting the longitudinal fibers of the metal without crushing or rupturing them or causing the tendency toward crystallization that is inherent in the ordinary mushroom-heads.

Having thus described the invention, what I claim, and desire to secure, is—

1. A metal wheel, comprising a hub having radial bosses provided with interiorly-threaded tapering sockets, and metal spokes having threaded tapering ends screwed to a seat in said sockets, the spokes engaging the interior of the sockets only and having no collars or other projections abutting against the ends of the sockets.

2. A metal wheel, comprising a hub formed as a unitary casting having radial integral bosses provided with interiorly-threaded tapering sockets, and metal spokes having plain tapered inner ends without collars or projections, the tapered portions of the ends being threaded so as to permit the spokes to be screwed to a seat in the sockets.

In testimony whereof I affix my signature in presence of two witnesses.

JAMES H. HASKINS.

Witnesses:
J. MUHLEMAN,
E. T. RUNGE.